United States Patent [19]

Glaser

[11] Patent Number: 4,913,606
[45] Date of Patent: Apr. 3, 1990

[54] TOOL-CHANGEOVER HOLDER

[75] Inventor: Franz Glaser, Nuremberg, Fed. Rep. of Germany

[73] Assignee: Hertel AG, Werkzeuge & Hartstoffe, Fed. Rep. of Germany

[21] Appl. No.: 321,180

[22] Filed: Mar. 9, 1989

[30] Foreign Application Priority Data

Mar. 10, 1988 [DE] Fed. Rep. of Germany ....... 3807887

[51] Int. Cl.⁴ ........................... B23C 5/26; B23B 31/10
[52] U.S. Cl. ........................................ 409/232; 82/159; 408/239 R; 409/234
[58] Field of Search ............... 409/232, 233, 234; 408/239 A, 239 R, 238; 82/159, 160; 51/168; 279/1 B, 1 ME

[56] References Cited

U.S. PATENT DOCUMENTS

| | | | |
|---|---|---|---|
| 3,271,848 | 9/1966 | Montandon | 409/232 X |
| 4,453,435 | 6/1984 | Saverwald et al. | 82/159 |
| 4,632,614 | 12/1986 | Rall et al. | 409/233 |
| 4,655,631 | 4/1987 | Mitchell | 409/232 X |
| 4,655,655 | 4/1987 | Schürfeld | 409/232 |
| 4,768,282 | 9/1988 | Rieck et al. | 408/239 R X |

FOREIGN PATENT DOCUMENTS

| | | | |
|---|---|---|---|
| 2260511 | 6/1974 | Fed. Rep. of Germany | 409/232 |
| 73252 | 4/1984 | Japan | 409/234 |
| 241011 | 10/1986 | Japan | 409/234 |

*Primary Examiner*—William Briggs
*Attorney, Agent, or Firm*—Spencer & Frank

[57] ABSTRACT

A tool changeover holder for machine tools has a rotationally driven spindle and a replaceable tool head that can be fixed thereto. The rotationally driven spindle has on the tool side a central journal, a chucking devoce and an annular face that surrounds this concentrically. The tool head has a central drilling to accommodate the spindle journal and an annular matching surface that surrounds the drilling concentrically. The spindle face and the matching surfaces have inversely congruent centering and torque-transmitting means that engage in each other in the chucked position. Hirth serration elements are arranged on the face of the spindle in a plurality of annular-sector shaped serration sections that lie on an annulus that is concentric with the axis of the spindle. These are separated from each other by the flat contact surface sections.

16 Claims, 4 Drawing Sheets

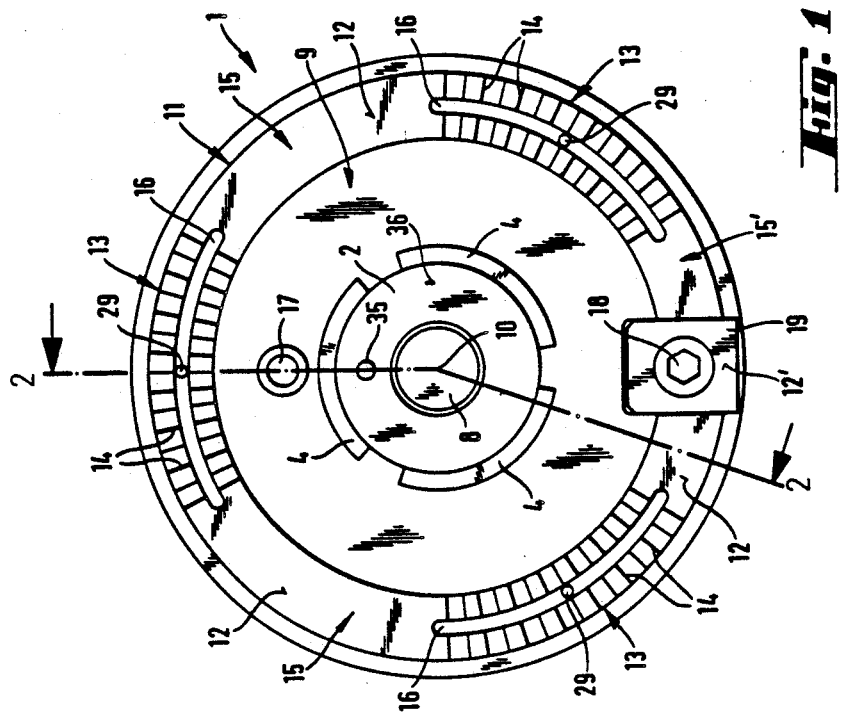
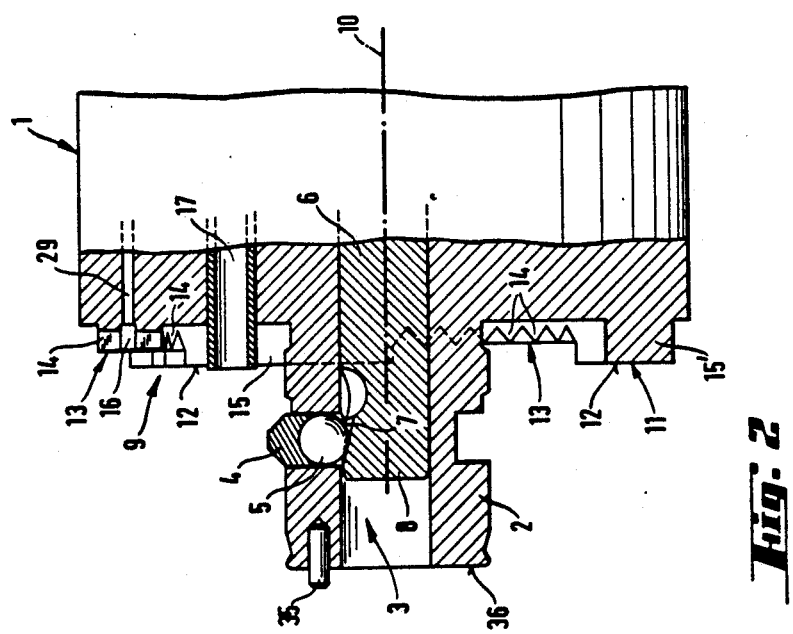

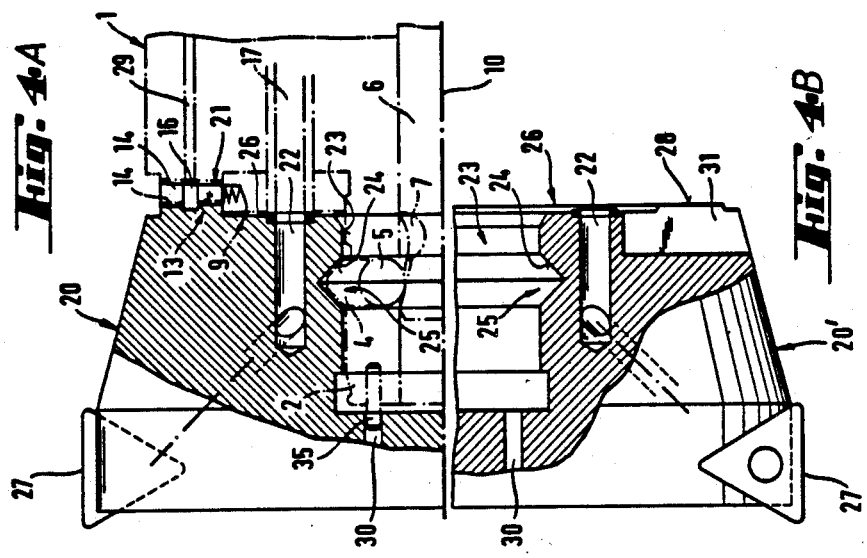
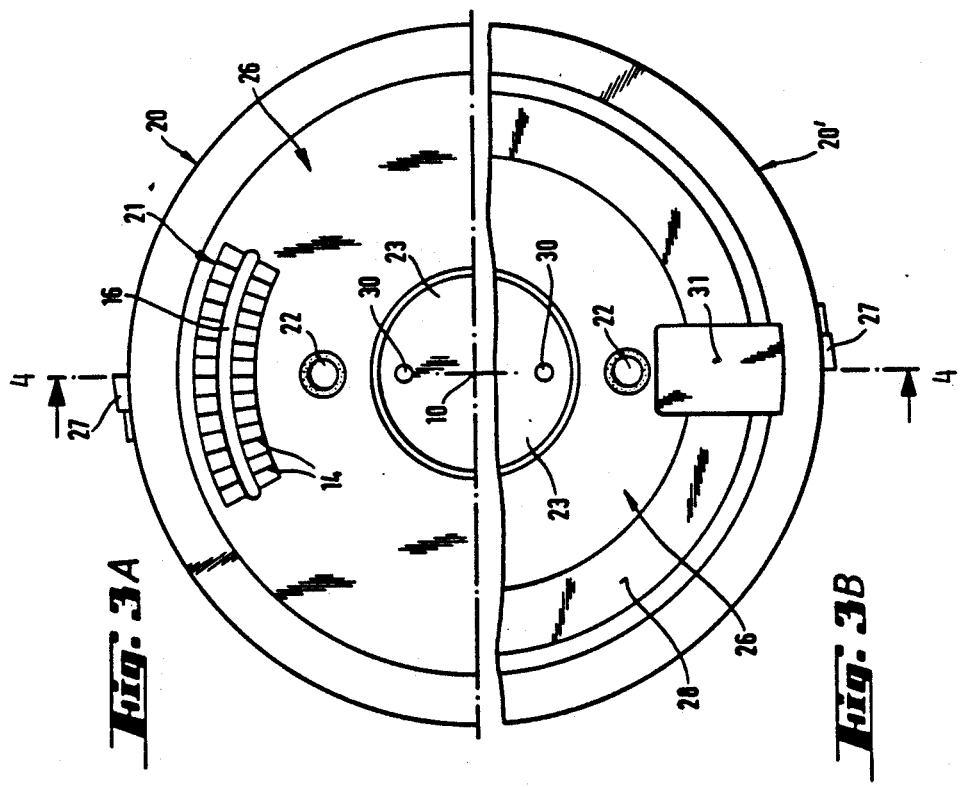

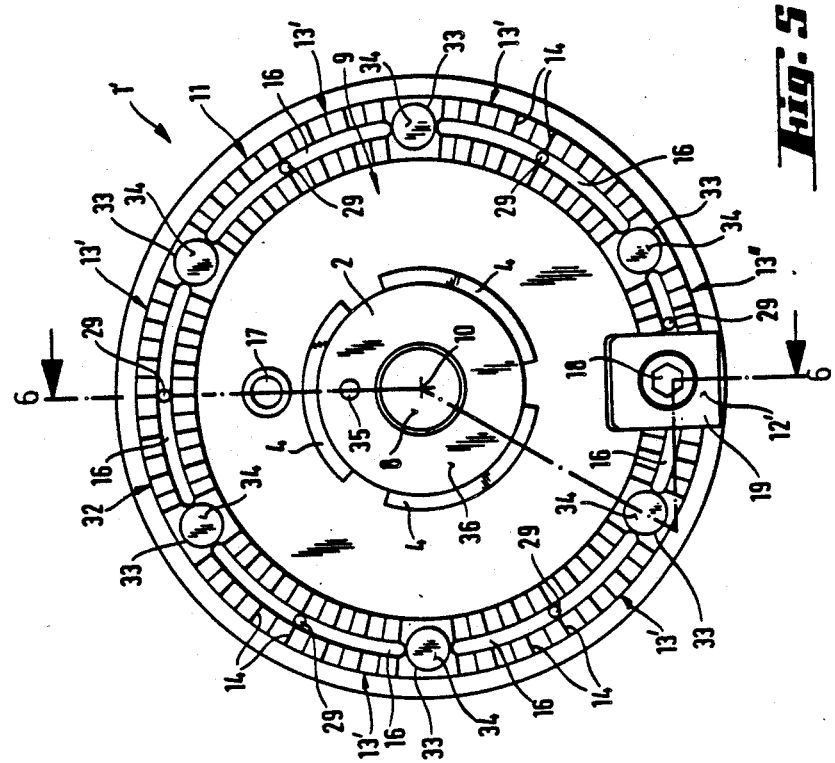
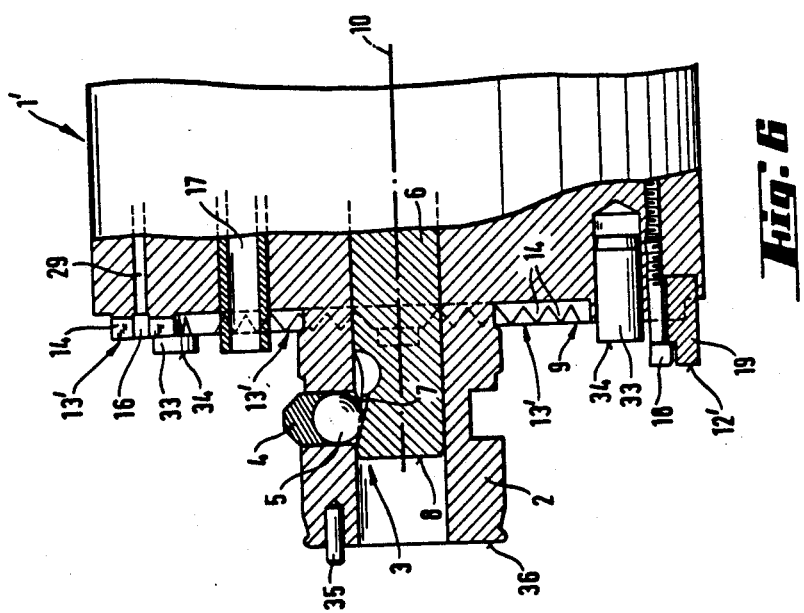

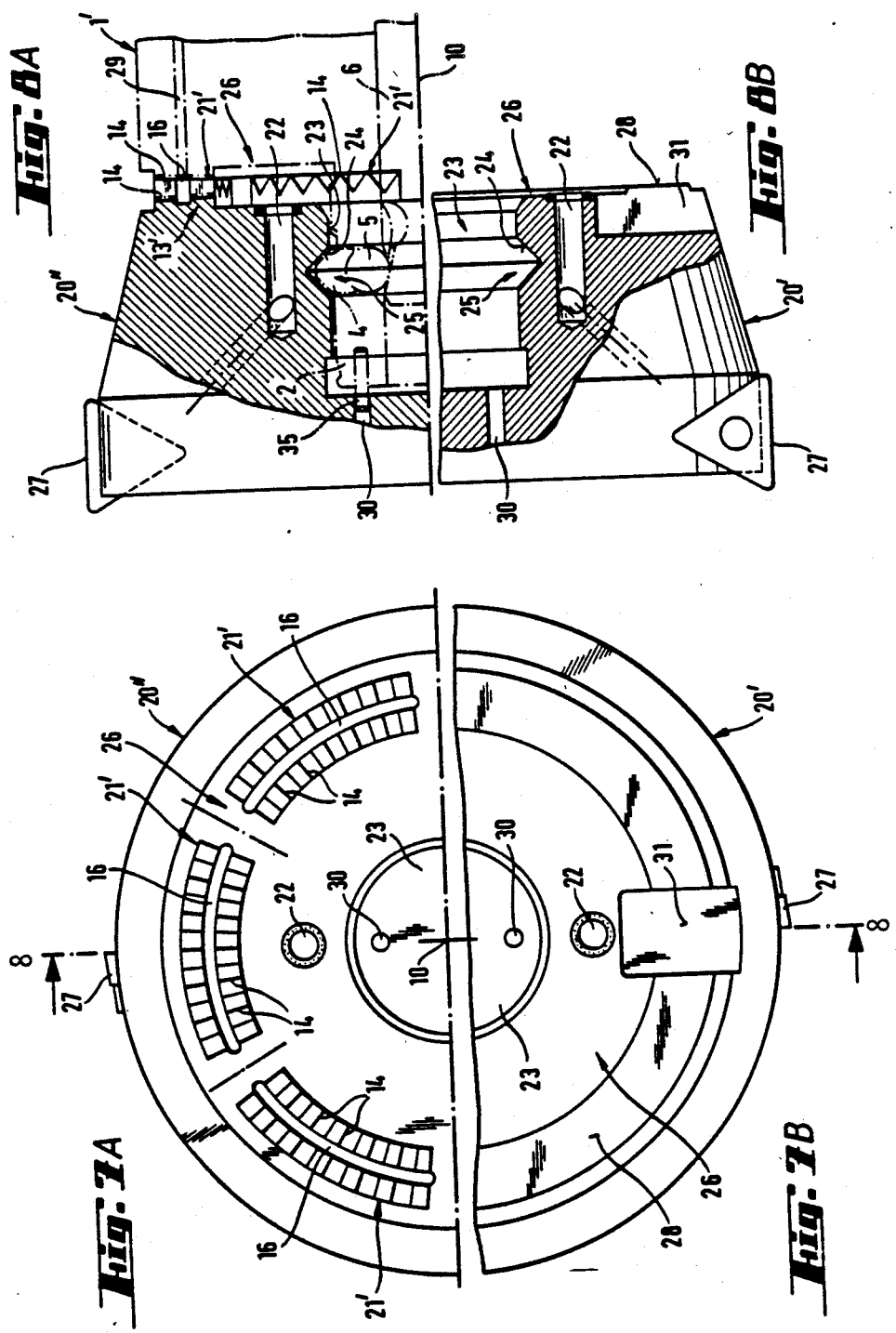

TOOL-CHANGEOVER HOLDER

FIELD OF THE INVENTION

The present invention relates to a tool-changeover holder for machine tools.

BACKGROUND OF THE INVENTION

Known tool changeover holders have a rotating spindle that has on the machine-tool end a central journal with a chuck and an annular face surface. A tool head is arranged so as to be replaceable on the spindle, and on the spindle side incorporates a central bore to accommodate the spindle journal and tighten it axially by means of a chucking device. The bore is surrounded concentrically by an annular matching surface.

The face and matching surface are provided with congruent centering and torque-transmitting means that engage each other in the chucked position. In this connection, a distinction must be drawn between two systems that differ in principle: In the first system, concentric, annular contact surfaces are provided on the face or matching surface of the spindle or tool head. The centering between these two components is effected by the engagement of the spindle journal into the tool-head bore. The transmission of torque is effected by a coupler block in the area of the face surface of the journal which, when in the chucked position of the tool head on the spindle, fits into a corresponding force-fit recess in the matching surface of the tool head. The second known alternative is to provide so called Hirth serrations in the area of the face and matching surfaces of the spindle and the tool head. These rows of radial serrations or teeth, which are arranged on annular rings in each instance concentric with the axis of the spindle, offer certain advantages relative to the flat contact surfaces with regard to the accuracy with which the tool head can be centered on the spindle and the transmission of torque. However, the production of changeover tool holders with such serrations entails much higher production costs than changeover tool holders with flat contact surfaces.

The changeover tool holders for machine tools and in particular for the so-called processing centers operate with tool heads that hold tools of various kinds, depending on the particular application. Varying demands on centering precision and torque transmission between tool head and spindle are imposed, depending on the processing stage and the associated permissible tolerances. Thus, a tool changeover holder with flat contact surfaces could be perfectly adequate for one particular processing stage, whereas serrations would be of advantage for another. However, because of the configuration of the particular spindle face with either a flat contact surface or serrations, there is no possibility of interchanging one for the other.

It is therefore an object of the present invention to provide a tool changeover holder, the spindle of which permits the use of a tool head with either a flat contact surface or one with Hirth serrations.

SUMMARY OF THE INVENTION

According to the present invention there is provided in a tool changeover holder for machine tools including a rotationally driven spindle having on the tool side thereof a central spindle journal with a chucking device concentrically surrounded by an annular spindle face having a plane substantially perpendicular to the axis of the spindle, and a replaceable tool head mountable on the spindle. The replaceable tool head has on a spindle side thereof a central bore for accommodating the spindle journal and axially chucking the tool head by means of the chucking device, and an annular matching surface that surrounds the central bore concentrically. The spindle face and the matching surface have congruent centering and torque-transmission means that engage each other in the chucking position. On the spindle face, Hirth serration elements are arranged in a plurality of annular-sector shaped Hirth serration segments located on an annular concentric with the axis of the spindle. The annular-sector shaped Hirth serration segments are separated from each other by the flat contact surface sections.

The use of both a tool with flat contact surfaces and one that incorporates Hirth serrations is made possible by the combination of Hirth serration elements with interposed flat contact surfaces, as is described herein. A suitable tool head can be selected during a specific stage of the work, depending on the demands for precise centering and torque transmission.

The use of the tool changeover holder according to the present invention results in the following advantages: The machine can be produced more cost effectively, since simple tool heads with flat contact surfaces can be used for those steps in the processing in which there are less stringent demands for precise centering and torque transmission. The processing centre can also work more economically in practical operations since the tool heads as wearing items need by replaced only according to type. Furthermore, qualitatively better machining of each production unit is ensured with reduced waste, since tool heads that incorporate Hirth serrations can be used for those steps in the process in which work is carried out at closer tolerances.

In a preferred embodiment the Hirth serrations and the flat contact surface sections of the annulus are spaced equidistantly relative to the periphery of the annulus, and are of peripheral length that correspond approximately to each other. This ensures that there is an approximately equal-sized contact surface between the matching surfaces of the tool head and the face of the spindle both for tool heads that incorporate Hirth serrations and for those with flat contact surfaces. This means that the wear behaviour of both types of chucking device is approximately the same.

Preferably, there are in each instance three serrated and flat contact surfaces are arranged alternately on the annulus. This arrangement provides the added advantage of allowing the tool head to be chucked in a statically determined manner. This means that if there are any production tolerances in the chucking surfaces, the tool head will be prevented from tipping or tilting relative to the spindle.

In a further preferred embodiment, a coupler block that extends beyond the face of the spindle is releasably secured within the area of one of the flat sections of the spindle face. This ensures, in a manner known per se, the transmission of torque onto a tool head with flat contact surfaces. When a tool head that incorporates Hirth serrations is used, the coupler block can be removed because of this releasable attachment, so that there need be no recess to accommodate the coupler block on the matching surface of this tool head.

Preferably, the face surfaces of the flat contact surface sections of the spindle are offset forwards in the direction of the tool head relative to the Hirth serration sections. This permits conventional tool heads with annular flat contact surfaces and a force-fit recess for the coupler block to be used with the tool changeover holder according to the present invention. If an existing machine tool is retrofitted with the tool changeover holder according to the present invention, the existing tool heads with flat contact surfaces can still be used.

In an alternative embodiment of the present invention, the face surface of the spindle has an annular Hirth serration in which a plurality of cylindrical hard-metal pins are arranged so as to be spaced evenly about the periphery of the annulus. The cylinder axes of the pins are parallel to the axis of the spindle and their face surfaces that are proximate to the tool head form the flat contact surface sections. In this arrangement, the flat contact surface sections are formed by a plurality of cylindrical hard-metal pins. This is particularly simple, because the flat sections are formed simply from the face ends of the hard-metal pins. Also, the hard-metal pins have a very low susceptibility to wear, which means that the spindle has a long service life. A further advantage of this configuration lies in the fact that the hard metal pins require a smaller proportion of the peripheral length of the spindle face, so that a greater peripheral length with correspondingly improved centering accuracy and torque transmission is available for the Hirth serrations.

In another embodiment, a tool head has Hirth serration sections that are inversely congruent to the Hirth serration or to the Hirth serration sections of the spindle, which are so raised relative to its matching surface in the direction of the spindle that in the chucked position the flat contact surface sections and the face surfaces of the spindle are not acted upon. In the chucked position, therefore, only the Hirth serration sections of the tool head and of the spindle engage each other; the flat contact surfaces of the spindle face are not acted upon by the corresponding parts of the matching surface of the tool head. It should be pointed out that when using such a tool head, the coupler block is removed from the face end of the spindle.

If the Hirth serration sections or the Hirth serration on the face of the spindle and optionally on the tool head matching surface are divided in two in a radial direction by a narrow, annular part groove that is concentric to the axis of the spindle, the Hirth serration sections on the face surface of the spindle, and optionally on the matching surface of the tool holder can be produced by non-cutting shaping, for example, by pressing, embossing, or forging. This results in considerable simplification compared to conventional production of Hirth serrations by grinding or milling. However, disproportionately high pressing or embossing forces have to be used during non-cutting type shaping in the case of a Hirth serration section that is undivided in the radial direction. Furthermore, the results of such production would not be satisfactory, since bulging and irregularities could occur in the Hirth teeth, and this could lead to imprecise positioning of the tool head of the spindle and to shortcomings in the centering effect achieved by the Hirth serrations. These disadvantages are avoided by the radial division of the Hirth serration sections into two parts. Although the absolute radial length of the Hirth teeth is reduced by the partial groove, the radial chucking length remains essentially unchanged. In addition, this also results in a statically determined, defined contact of the Hirth serration sections of the tool head on those of the face surface of the spindle.

In another embodiment, at least one system bore that passes through the spindle, preferably parallel to its axis, opens out in the face of the spindle, in the area of the Hirth serration of the serrated sections, the flat contact surface sections or of the partial groove. Because of these system bores, it is possible to incorporate various measures in the tool changeover holder according to the present invention, by means of which, for example, the seating of the tool head can be monitored or which lead to improved centering and positioning precision.

If the system bore is a line bore for a cleaning agent used to clean the face and matching surfaces of the spindle and the tool head during a tool change, the system bore can serve as a line for cleaning agents to clean the face and matching surfaces of the tool head and the spindle during a tool change. Such a cleaning agent may be compressed air or a flushing liquid, for example. In a tool changeover, the line bore is acted upon by compressed air, which blows out the teeth and the flat contact surface sections of the face and matching surfaces when the tool head approaches the machine spindle and thus removes any dirt or foreign bodies.

If the system bore is a passage drilling for instrument leads of a sensor system, by means of which the seating of the serrations of the tool head on the spindle can be monitored, the instrument leads for a sensor system can be led through the system bore, and this system can then be used to monitor the proper seating of the tool head on the spindle.

If the system bore is a pressure line for a pressurized medium used to monitor the seating of the serrations of the tool head on the spindle by means of a dynamic pressure measurement system, the system bore can be a pressure line for a pressurized medium to monitor the engagement of the serrations of the tool head on the spindle, by means of a system used to measure dynamic pressure.

The measures described above result in a high level of positioning precision and centering, and mean that the tool is used only if it is in its intended nominal position on the machine spindle.

BRIEF DESCRIPTION OF THE DRAWINGS

The invention will now be described in more detail, by way of example only, with reference to the accompanying drawings in which:

FIG. 1 is an axial view of a a first embodiment of a machine spindle;

FIG. 2 is an axial cross-section of the machine spindle on the line 2—2 in FIG. 1;

FIG. 3a shows a a first embodiment of a partial axial cross-section of a tool head with Hirth serration sections;

FIG. 3b shows a partial axial cross-section of a tool head with conventional flat contact surfaces;

FIG. 4a, 4b are axial cross-sectionals of the tool head on the line 4—4 in FIG. 3;

FIG. 5 is an axial cross-section of a a second embodiment of a machine spindle;

FIG. 6 is an axial cross-section of the machine spindle on the line 6—6 in FIG. 5;

FIG. 7a is a partial axial cross-section of a a second embodiment of a tool head with Hirth serration sections;

FIG. 7b is a further axial cross-section of a tool head with conventional flat contact surfaces; and FIGS. 8a and 8b show axial cross-sections of the tool heads on the lines 8—8 in FIG. 7.

DESCRIPTION OF THE PREFERRED EMBODIMENT

The machine-tool spindle 1 shown in FIGS. 1 and 2 has at the tool-head end a central adapter journal 2 that incorporates a chuck 3. This chuck consists of a truncated conical engagement element 4 that anbe displaced radially outwards and driven by an interposed ball 5 by a central pull rod 6. The transfer of motion from the pull rod 6 to the ball 5 and then on through the engagement element 4 is effected through a suitably formed control groove 7 at the journal end 8 of the pull rod 6.

The journal 2 is surrounded concentrically by an annular face 9 that is arranged with its principle plane perpendicular to the axis 10 of the spindle. In the spindle 1 as in FIGS. 1 and 2, there are Hirth serration elements 14 formed in three annular-sector shaped serrated sections 13 on an annular ring 11 that is concentric to the spindle axis 10 and projects in the direction of the tool head. The individual toothed sections 13 are separated from each other by flat sections 15 that are also in the form of annular sections. The toothed sections 13 and the flat sections 15 are arranged at equal angular distances from each other on the annular ring 11. The annular ring 11 itself is of an outside diameter that is slightly smaller than the outside diameter of the face 9. Its inside diameter is approximately 0.7 times the outside diameter of the face. The Hirth serrated sections 13 are formed by a non-cutting, embossing process. An accurate tooth shape is achieved by the dividing groove section 16 that is concentric to the axis 10 of the spindle that divides the serrated sections 13 radial at the approximate center.

As can be seen in particular from FIG. 2, the faces 12 of the flat sections 15 of the spindle 1 are offset forward in the direction of the tool head 20, relative to the serrated sections 13. A coupler is releasably secured in a suitable recess in an flat section 15' by means of a hexagon-socket set screw. The face 12' of the coupler 19 extends beyond the face 12 of the flat section 15, 15' towards the tool head 20.

FIGS. 1 and 2 also show a coolant line 17 that is arranged so as to be parallel to the axis 10 of the spindle within the annulus 11 and ends just in front of the face 12 of the flat section 15, 15'.

FIGS. 3 and 4 show tool heads 20, 20' that can be installed on the spindle 1. To this end, on the spindle end, these have a bore 23 to accommodate the journal 2. Within the bore 23 there is an annular groove 25 with a conical surface 24, in which the engagement element 4 of the journal fits. By this means, the tool head 20 is held axially against the spindle 2.

The bore 23 is surrounded concentrically by an annular matching surface 26. In the tool head shown in FIG. 4a, this matching surface 26 has Hirth serration sections 21 that are inversely congruent to the toothed sections 13 of the annulus 11 of the spindle 1 as in FIGS. 1 and 2. Secure attachment with self-centering and a high level of positional accuracy is ensured by the mutual fit of the toothed sections 13, 21 of the tool head 20 and the spindle 1. In order that the matching surface 26 does not come into contact on the flat sections 15, 15' of the spindle face end 9 in the areas that surround the Hirth serration sections 21, the Hirth serration sections 21 are arranged so as to be higher than the matching surface 26 (FIG. 4a).

The coolant line 22 of the tool heads 20, 20' that opens out radially into the matching surface 26 within the Hirth serration sections 21 is connected with the coolant line 17 in the spindle 1 when in the chucked position.

FIGS. 3b, 4b, 7b and 8b show a tool head 20' that is fitted in the same manner as the tool head 20 with cutter inserts 27 in the form of reversible cutter plates. As is usual, the tool head 20 has an annular face end surface 28 that projects somewhat towards the spindle 1, although less than the Hirth serration sections 21 of the tool head 20. The inside and outside diameters of the annular flat surface 28 correspond to those of the annulus 11 of the spindle 1. In the chucked position, the end face surface 28 of the tool head 20' lies on the flat surfaces 15, 15' of the spindle 1. Its coupler 19 engages in the positive-fit recess 31 of the tool head 20', and this ensures the transfer of torque between the spindle 1 and the tool head 20'.

FIGS. 5 and 6 show a spindle 1' in a second alternative embodiment. All that will now be explained are the differences relative to the spindle 1 shown in FIGS. 1 and 2. These are, mainly that the spindle has an annular Hirth serration 32 and six cylindrical hard-metal pins 33 are inserted equidistantly around the periphery of the spindle 1 with their cylinder axes parallel to the axis 10 of the spindle. The hard metal pins 33 divide the Hirth serrations 32 into six annular serrated sections 13', 13" and with their face surfaces 34 that are proximate to the tool head they form the flat contact surface for the tool head 20' (FIGS. 3b, 4b, 7b, 8b). The Hirth serration 32 is interrupted at the insertions points of the hard-metal pins 33. Their face surfaces 34 protrude beyond the Hirth serrations 32 in the direction of the tool head 20', analogously to the face sections 15, 15'. A coupler block 19 is releasably secured by means of a hexagonal socket set screw 18 between two hard-metal pins 33 in the area of the interposed serrated section 13".

FIGS. 7a and 8a show a tool head 20" that can be chucked by the spindle 1'. This tool head has Hirth serration sections 21' that are inversely congruent to the sections 13' of Hirth serrations 32 of the spindle 1 that lie between the hard-metal pins 33. The Hirth serration sections 21' are also raised relative to the machine surface 26 of the tool head 20', in order that the matching surface 26 does not come into contact with the face ends 34 of the hard-metal pins 33 when in the chucked position.

The tool head 20' that is shown in FIGS. 7b and 8b is identical to the tool head 20' shown in FIGS. 3b and 4b. In the chucked position the tool head 20' lies on the face surfaces 34 of the hard-metal pins 33, the coupler block 19 that projects beyond the face surfaces 34 once again lying in the force-fit recess 31 of the tool head 20'.

The Hirth serrations 32 or the Hirth serration sections 21, 21' incorporate the part groove 16.

It should be pointed out that in the two embodiments of the spindle 1, 1' shown, system bores 29 open out into the part grooves 16; these drillings extend parallel to the axis 10 of the spindle. These bores can be used to run sensor lines into the area of the serrated sections 13, 13', 13" or of the Hirth serrations 32 in order to facilitate monitoring the functioning of the serrations between the tool head 20, 20" and the spindle 1, 1'. The face surface 9 and matching surface 26 of the spindle 1, 1' or the tool head 20, 20', 20" can also be acted upon by compressed air that is supplied through the system bores 29, said compressed air then being used to clean these areas.

The alignment pin 35 on the face annular surface 36 of the spindle journal 2, which fits into the drilling 30 in the base of the drilling 23, fixes the tool head 20, 20′, 20″ in a defined angular position on the spindle 1, 1′.

I claim:

1. A tool changeover holder for machine tools, comprising:
   a rotationally driven spindle having a central spindle journal including a chucking device concentrically surrounded by an annular spindle face in a plan substantially perpendicular to the axis of said spindle, and
   a replaceable tool head mountable on said spindle, said replaceable tool head having on a spindle side thereof:
      a central bore for receiving said spindle journal and axially chucking said tool head by means of said chucking device, and
      an annular matching surface that surrounds said central bore concentrically,
   said spindle face and said matching surface having congruent centering and torque-transmission means that engage in each in a chucked position, said centering and torque-transmission means including Hirth serration elements disposed on said spindle face and arranged in a plurality of annular-sector shaped Hirth serration sections located on an annulus concentric with the axis of the spindle, said annular-sector shaped Hirth serration sections being separated from each other by flat contact surface sections.

2. The changeover tool holder as claimed in claim 1, wherein said Hirth serration sections and said flat contact surface sections on said annulus are spaced equidistantly around said annulus and have approximately equal circumferential lengths.

3. The changeover tool holder as claimed in claim 1, wherein three Hirth serration sections and three flat contact surface sections are arranged alternately on said annulus.

4. The changeover tool holder as claimed in claim 3, further comprising a coupler block that extends beyond said spindle face in the direction of said tool head and is releasably secured in the area of one of said flat contact surface sections of said spindle face.

5. The changeover tool holder as claimed in claim 1, wherein the face surfaces of said flat contact surface sections of said spindle are offset forwards in the direction of said tool head relative to said Hirth serration sections.

6. The changeover tool holder as claimed in claim 5, wherein said flat contact surface sections comprise a plurality of cylindrical hard metal pins spaced evenly about the circumference of the annulus, said hard metal pins having longitudinal axes parallel to the axis of said spindle.

7. The changeover tool holder as claimed in claim 6, further comprising a coupler block which extends in the direction of said tool head and is releasably secured in the area of one of said Hirth serration sections.

8. The changeover tool holder as claimed in claim 7, wherein said coupler block is releasably secured between two of said hard metal pins.

9. The changeover tool holder as claimed in claim 5. Wherein said tool head has an annular flat surface for receiving said spindle face and a force-fit recess for receiving said coupler block.

10. The changeover tool holder as claimed in claim 1, wherein said tool head includes Hirth serration sections for mating with said Hirth serration sections of said spindle, said tool head Hirth serration sections being raised relative to said matching surface of said tool head so that when said tool head and said spindle are in said chucked position, no force is applied by said tool head on said flat contact surface sections of said spindle.

11. The changeover holder as claimed in claim 1, wherein said Hirth serration sections on said spindle face each include a narrow, annular groove which divides said serration sections in two and is concentric to the axis of said spindle.

12. The changeover tool holder as claimed in claim 1, wherein said Hirth serration sections on said spindle face and on said tool head matching surface each include a narrow, annular groove which divides said serration sections in two and is concentric to the axis of said spindle.

13. The changeover tool holder as claimed in claim 1, further comprising at least one system bore that passes through said spindle and has an opening in said annulus.

14. The changeover holder as claimed in claim 13, wherein said at least one system bore is a line bore for a cleaning agent used to clean said spindle face and said tool head matching surface during a tool change.

15. The changeover tool holder as claimed in claim 13, wherein said at least one system bore is a passage bore for receiving instrument leads of a sensor system for monitoring the seating of said tool head serration sections on said spindle.

16. The changeover tool holder as claimed in claim 13, wherein said at least one system bore is a pressure line for a pressurized medium used to monitor the seating of said tool head serration sections on the spindle by means of a dynamic pressure measurement system.

* * * * *